United States Patent
Mildh et al.

(10) Patent No.: US 9,883,378 B2
(45) Date of Patent: Jan. 30, 2018

(54) NETWORK NODE, A WIRELESS DEVICE AND METHODS THEREIN FOR HANDLING RADIO ACCESS NETWORK (RAN) CONTEXT INFORMATION IN A WIRELESS COMMUNICATIONS NETWORK

(71) Applicant: Telefonaktiebolaget L M Ericsson (publ), Stockholm (SE)

(72) Inventors: Gunnar Mildh, Sollentuna (SE); Jari Vikberg, Järna (SE); Johan Rune, Lidingö (SE); Icaro Leonardo J. Da Silva, Bromma (SE); Pontus Wallentin, Linköping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 160 days.

(21) Appl. No.: 14/758,634

(22) PCT Filed: May 6, 2015

(86) PCT No.: PCT/SE2015/050497
§ 371 (c)(1),
(2) Date: Jun. 30, 2015

(87) PCT Pub. No.: WO2016/178605
PCT Pub. Date: Nov. 10, 2016

(65) Prior Publication Data
US 2016/0330612 A1  Nov. 10, 2016

(51) Int. Cl.
*H04W 36/00* (2009.01)
*H04W 8/24* (2009.01)
*H04W 84/04* (2009.01)

(52) U.S. Cl.
CPC ............ *H04W 8/24* (2013.01); *H04W 84/042* (2013.01)

(58) Field of Classification Search
CPC ........... H04W 36/0083; H04W 76/028; H04W 76/046; H04W 76/048; H04W 88/06;
(Continued)

(56) References Cited

U.S. PATENT DOCUMENTS 8,538,433 B2 * 9/2013 Kekki .................. H04W 48/17
370/310
2008/0008127 A1  1/2008 Choi et al.
(Continued)

FOREIGN PATENT DOCUMENTS

EP  2 757 856 A1 *  7/2014  ............ H04W 76/06
EP  2757856 A1  7/2014
(Continued)

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.
(Continued)

*Primary Examiner* — Sai Aung
(74) *Attorney, Agent, or Firm* — Withrow & Terranova, PLLC

(57) ABSTRACT

Embodiments herein relate to a network node for handling a Radio Access Network, (RAN) context information of a wireless device in a cell served by the network node in a wireless communications network. The network node stores the RAN context information of the wireless device when the wireless device is no longer in a connected state in the cell. When the wireless device has returned to a connected state in the cell, the network node receives information indicating a RAN context information from the wireless
(Continued)

device. Also, the network node transmits, to the wireless device, information indicating that the wireless device is to use the indicated RAN context information in the cell when the indicated RAN context information is such that it can be reused with the RAN context information of the wireless device previously stored by the network node. Embodiments of the network node are also described.

32 Claims, 6 Drawing Sheets

(58) Field of Classification Search
CPC ..... H04W 36/30; H04W 24/02; H04W 24/10; H04W 36/0016; H04H 60/91; H04H 20/72; H04H 40/18; H04H 20/57; H04H 20/24; H04H 2201/33
See application file for complete search history.

(56) References Cited

U.S. PATENT DOCUMENTS

| | | | | |
|---|---|---|---|---|
| 2011/0009119 A1* | 1/2011 | Breuer | ............. | H04W 36/0055 455/436 |
| 2012/0164979 A1* | 6/2012 | Bachmann | ............ | H04L 63/164 455/411 |

FOREIGN PATENT DOCUMENTS

| | | |
|---|---|---|
| EP | 2876948 A1 | 5/2015 |
| WO | 2009135438 A1 | 11/2009 |
| WO | 2009139675 A1 | 11/2009 |
| WO | 2013066531 A1 | 5/2013 |
| WO | 2013110543 A1 | 8/2013 |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.0.0, 3GPP Organizational Partners, Dec. 2013, 208 pages.

Author Unknon, "Technical Specification Group Radio Access Network; Evolved Universal Terrestrial Radio Access (E-UTRA); Radio Resource Control (RRC); Protocol specification (Release 12)," Technical Specification 36.331, Version 12.5.0, 3GPP Organizational Partners, Mar. 2015, 445 pages.

IPwireless Inc., "R2-121550: On Retaining RRC Context," 3rd Generation Partnership Project, TSG RAN WG2 Meeting #77b, Mar. 26-30, 2012, 7 pages, Jeju, Korea.

International Search Report and Written Opinion for International Patent Appliation No. PCT/SE2015/050497, dated Jan. 25, 2016, 15 pages.

Ericsson, "Tdoc R2-163998: Handling of inactive UEs," 3rd Generation Partnership Project (3GPP), TSG-RAN WG2 #94, May 23-27, 2016, 6 pages, Nanjing, P.R. China.

International Search Report and Written Opinion for International Patent Application No. PCT/SE2017/050537, dated Aug. 29, 2017, 16 pages.

* cited by examiner

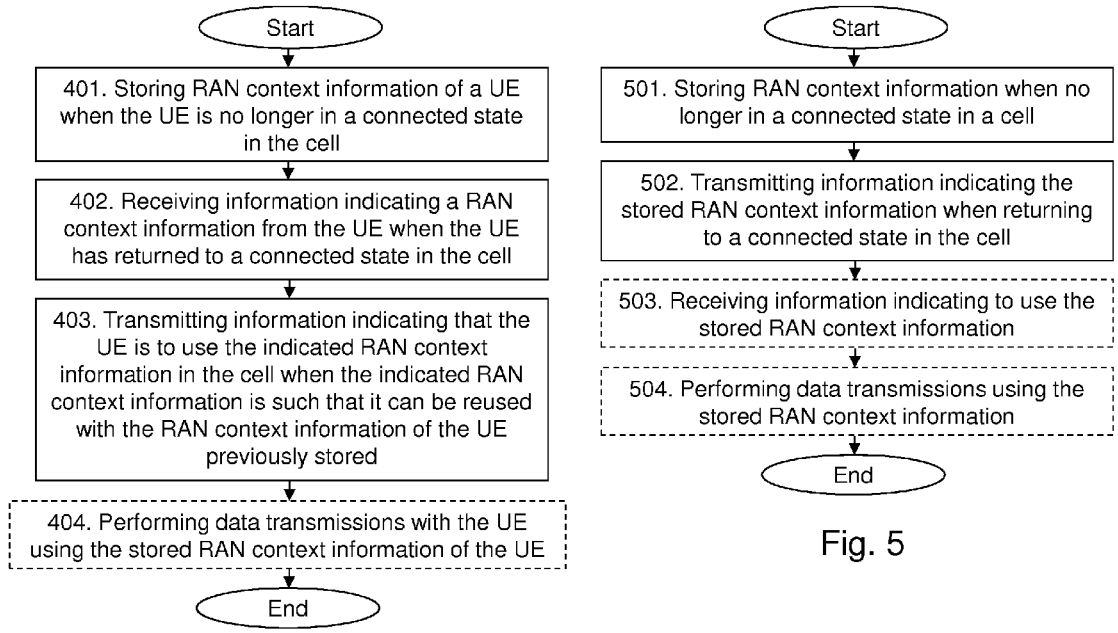

NETWORK NODE, A WIRELESS DEVICE AND METHODS THEREIN FOR HANDLING RADIO ACCESS NETWORK (RAN) CONTEXT INFORMATION IN A WIRELESS COMMUNICATIONS NETWORK

This application is a 35 U.S.C. § 371 national phase filing of International Application No. PCT/SE2015/050497, filed May 6, 2015, the disclosure of which is incorporated herein by reference in its entirety.

TECHNICAL FIELD

Embodiments herein relate to handling information in a wireless communications network. In particular, embodiments herein relate to a network node, a wireless device and methods therein for handling a Radio Access Network, RAN, context information in a wireless communications network.

BACKGROUND

In a typical wireless, cellular or radio communications network, wireless devices, also known as mobile stations, terminals, and/or User Equipment, UEs, communicate via a Radio-Access Network, RAN, with one or more core networks. The RAN covers a geographical area which is divided into cells, with each cell being served by a base station, e.g. a radio base station, RBS, or network node, which in some networks may also be called, for example, a "NodeB", "eNodeB" or "eNB". A cell is a geographical area where radio coverage is provided by the radio base station at a base station site or an antenna site in case the antenna and the radio base station are not collocated. One radio base station may serve one or more cells.

A Universal Mobile Telecommunications System, UMTS, is a third generation mobile communication system, which evolved from the second generation, 2G, Global System for Mobile Communications, GSM. The UMTS terrestrial radio-access network, UTRAN, is essentially a RAN using wideband code-division multiple access, WCDMA, and/or High-Speed Packet Access, HSPA, to communicate with user equipment. In a forum known as the Third Generation Partnership Project, 3GPP, telecommunications suppliers propose and agree upon standards for third generation networks and UTRAN specifically, and investigate enhanced data rate and radio capacity. In some versions of the RAN, as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio-Access Network, E-UTRAN, also known as the Long-Term Evolution, LTE, radio access, and the Evolved Packet Core, EPC, also known as System Architecture Evolution, SAE, core network. E-UTRAN/LTE is a variant of a 3GPP radio-access technology wherein the radio base station nodes are directly connected to the EPC core network rather than to RNCs. In general, in E-UTRAN/LTE the functions of a RNC are distributed between the radio base station nodes, e.g. eNodeBs in LTE, and the core network. As such, the Radio-Access Network, RAN, of an EPS has an essentially flat architecture comprising radio base station nodes without reporting to RNCs.

FIG. 1 illustrates the current standard EPC architecture of a wireless communications network. The EPC architecture, including all of its components and interfaces, is further described and defined in 3GPP TS 23.401, version 12.0.0. The current standard E-UTRAN architecture is further described and defined in e.g. 3GPP TS 36.300, version 12.0.0.

FIG. 2 illustrates the radio interface user and control plane protocol for E-UTRAN. The E-UTRAN radio interface user and control plane protocol consists of the following protocol layers and main functionalities.

Radio Resource Control, RRC (Control Plane Only)

The main function for control plane: broadcast of system information for both Non-Access Stratum, NAS, and Access Stratum, AS; paging; Radio Resource Control, RRC, connection handling; Allocation of temporary identifiers for the UE; Configuration of signaling radio bearer(s) for RRC connection; Handling of radio bearers; Quality-of-Service, QoS, management functions; Security functions including key management; Mobility functions (including UE measurement reporting and control of the reporting, handover, UE cell selection and reselection and control of cell selection and reselection); and NAS direct message transfer to/from the UE.

Packet Data Convergence Protocol, PDCP

There exists one PDCP entity for each radio bearer for the UE. PDCP is used for both control plane, i.e. RRC, and for user plane, i.e. user data received via GTP-U signaling. Main function for control plane is ciphering/deciphering and integrity protection. Main functions for user plane: ciphering/deciphering, header compression and decompression using Robust Header Compression, ROHC, and in-sequence delivery, duplicate detection and retransmission.

Radio Link Control, RLC

The RLC layer provides services for the PDCP layer and there exists one RLC entity for each radio bearer for the UE. Main functions for both control and user plane: segmentation/concatenation, retransmission handling, duplicate detection, and in-sequence delivery to higher layers.

Medium Access Control, MAC

The MAC provides services to the RLC layer in the form of logical channels, and performs mapping between these logical channels and transport channels. Main functions are: uplink and downlink scheduling, scheduling information reporting, Hybrid Automatic Repeat reQuest, HARQ, retransmissions, and multiplexing/de-multiplexing data across multiple component carriers for carrier aggregation.

Physical Layer, PHY

The PHY provides services to the MAC layer in the form of transport channels and handles mapping of transport channels to physical channels.

Information relating to one or more of these protocol layers and their functionality is hereinafter referred to as Radio Access Network, RAN, context information. In other words, the configuration of these protocol layers for a particular wireless device would be the RAN context information of this particular wireless device in the wireless communications network. The configuration of these protocol layers are typically done by on the RRC layer via RRC configuration messages. One example of configuration specific information is different identifiers on the different protocol layers for the wireless device. However, it should also be noted that the RAN context information may further include additional information, such as, for example, radio access capabilities of the wireless device, previous mobility or traffic history of the wireless device, etc.

The above described functionality of the network node, eNB, may be deployed in different ways. In one example, all the protocol layers and related functionality is deployed in the same physical node including the antenna. One example of this is a so-called Pico or Femto eNodeB. Another example is a so-called Main-Remote split. In this case, the eNodeB is divided into a main unit and a remote unit. The main unit may also be referred to as a Digital Unit, DU, and the remote unit also referred to as a Remote Radio Unit, RRU. In this case, the main unit comprises all the protocol layers, except the lower parts of the PHY layer that are instead placed in the remote unit. In a further example, remote unit and the antenna are co-located. This may be referred to as an Antenna Integrated Radio, AIR, system.

SUMMARY

It is an object of embodiments herein to improve the signalling in a wireless communications network.

According to a first aspect of embodiments herein, the object is achieved by a method performed by a network node for handling a Radio Access Network, RAN, context information of a wireless device in a cell served by the network node in a wireless communications network. The network node stores the RAN context information of the wireless device when the wireless device is no longer in a connected state in the cell. Also, the network node receives information indicating a RAN context information from the wireless device when the wireless device has returned to a connected state in the cell. Further, the network node transmits, to the wireless device, information indicating that the wireless device is to use the indicated RAN context information in the cell when the indicated RAN context information is such that it can be reused with the RAN context information of the wireless device previously stored by the network node.

According to a second aspect of embodiments herein, the object is achieved by a network node for handling a RAN context information of a wireless device in a cell served by the network node in a wireless communications network. The network node is configured to store the RAN context information of the wireless device when the wireless device is no longer in a connected state in the cell. The network node is also configured to receive information indicating a RAN context information from the wireless device when the wireless device has returned to a connected state in the cell. The network node is further configured to transmit, to the wireless device, information indicating that the wireless device is to use the indicated RAN context information in the cell when the indicated RAN context information is such that it can be reused with the RAN context information of the wireless device previously stored by the network node.

According to a third aspect of embodiments herein, the object is achieved by a method performed by a wireless device for handling a RAN context information in a cell served by a network node in wireless communications network. The wireless device stores the RAN context information of the wireless device when no longer in a connected state in the cell. Also, the wireless device transmits, to the network node, information indicating the stored RAN context information when the wireless device returns to a connected state in the cell.

According to a fourth aspect of embodiments herein, the object is achieved by a wireless device for handling a RAN context information in a cell served by a network node in wireless communications network. The wireless device is configured to store the RAN context information of the wireless device when no longer in a connected state in the cell. The wireless device is also configured to transmit, to the network node, information indicating the stored RAN context information when the wireless device returns to a connected state in the cell.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By storing the RAN context information of a wireless device when the wireless device is no longer in a connected state in the cell, the network node is able to, when the wireless device has returned to a connected state in the cell and upon receiving information indicating a RAN context information from the wireless device, transmit information indicating that the wireless device should reuse the RAN context information in the cell as indicated. This may be performed by the network node when the indicated RAN context information from the wireless device is such that it can be reused with the RAN context information of the wireless device previously stored by the network node.

This means that for semi-stationary wireless devices, i.e. wireless devices that may toggle back and forth between different states in a cell or toggle between different cells in an active state, the RAN context information do not have to be re-establish each time the wireless device changes state in a cell or changes cell. This means that excessive signaling in the wireless communication network may be avoided. Hence, signalling in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 4 is a flowchart depicting embodiments of a method in a network node, FIG. 5 is a flowchart depicting embodiments of a method in a wireless device.

DETAILED DESCRIPTION

Figure 1:
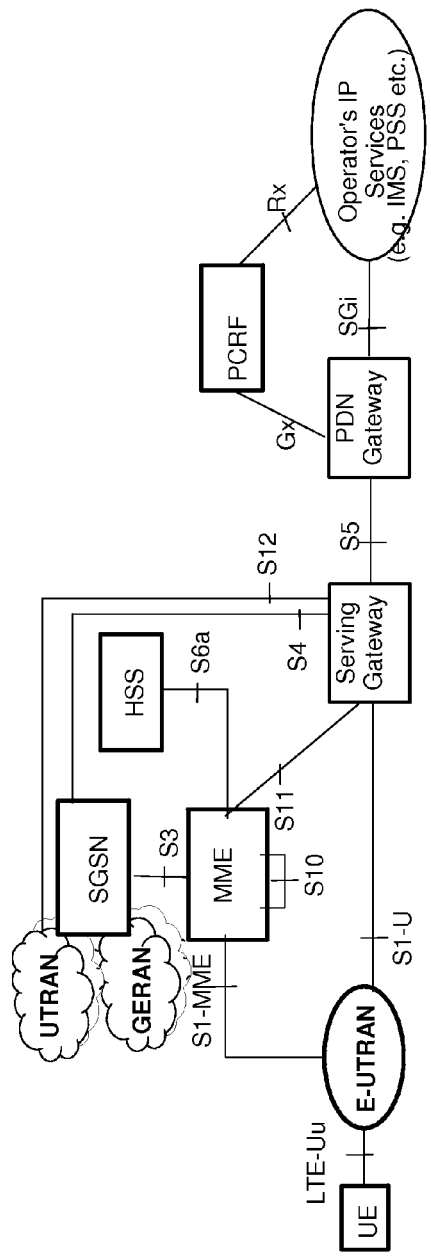
FIG. 1 is a schematic block diagram illustrating a standard EPC architecture of a wireless communications network.
Figure 2:
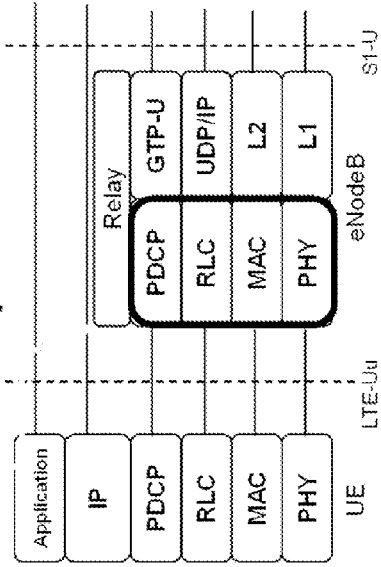
FIG. 2 is another schematic block diagram illustrating a standard E-UTRAN radio interface user and control plane protocol architecture in a wireless communications network.
Figure 2:
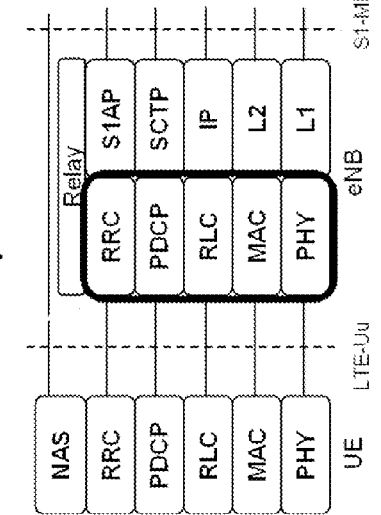

The figures are schematic and simplified for clarity, and they merely show details which are essential to the understanding of the embodiments presented herein, while other details have been left out. Throughout, the same reference numerals are used for identical or corresponding parts or steps.

Figure 3:
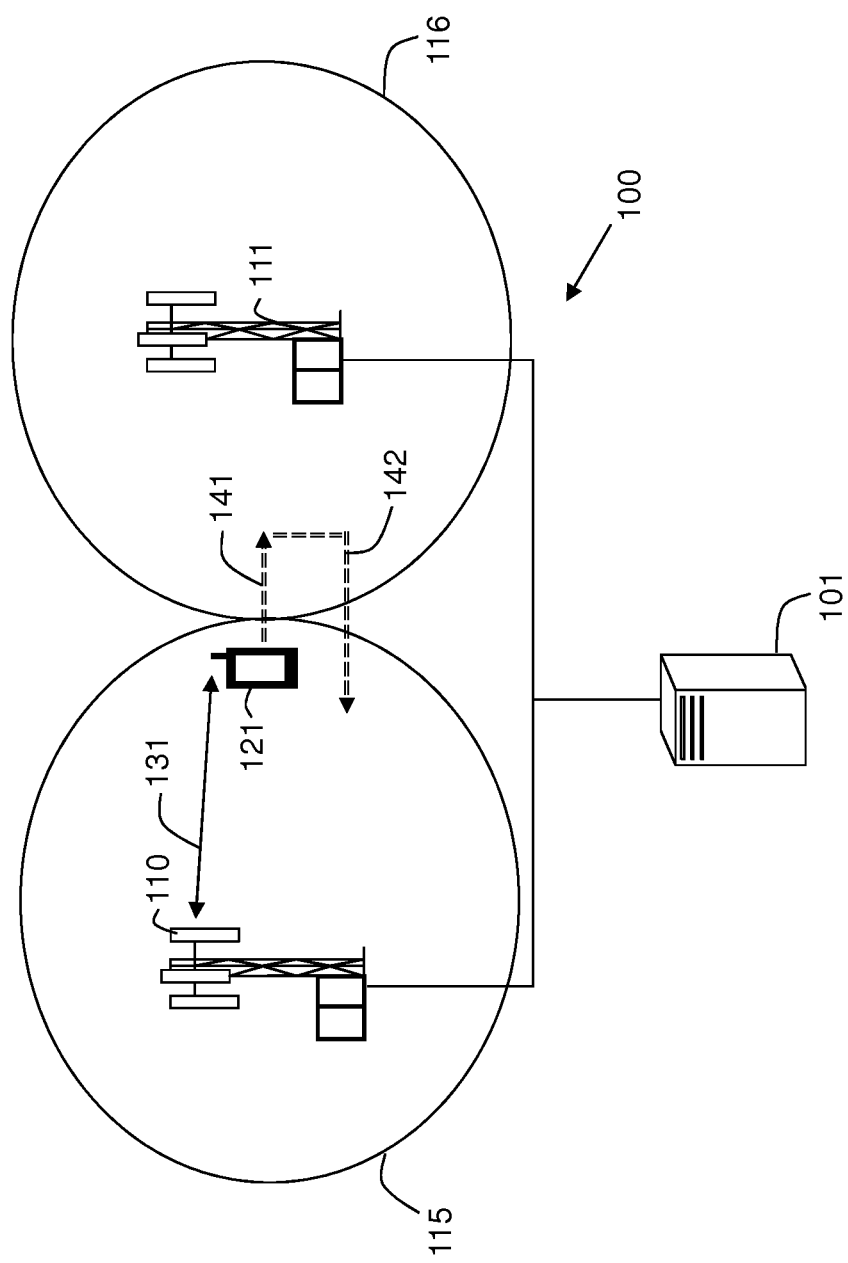
FIG. 3 is a schematic block diagram illustrating embodiments of a network node and a wireless device in a wireless communications network.

FIG. 3 shows an example of a wireless communications network 100 in which embodiments herein may be implemented. Although illustrated in FIG. 1 as an LTE network, the wireless communications network 100 may be any wireless or radio communication system, such as, LTE-Advanced, Wideband Code-Division Multiple Access (WCDMA), Global System for Mobile communications/ Enhanced Data rate for GSM Evolution (GSM/EDGE), Worldwide Interoperability for Microwave Access (Wi-Max), Ultra Mobile Broadband (UMB) or GSM network, or other cellular network or system, such as, a future 5G wireless communication system.

The wireless communications network 100 comprises a first network node 110 and a second network node 111. The first and second network node 110, 111 may e.g. be an eNB, eNodeB, or a Home Node B, a Home eNode B, femto Base Station (BS), pico BS or any other network unit capable to serve a wireless device in the wireless communications network 100. The first and second network node 110, 111 may also be e.g. a radio base station, a base station controller, a network controller, a relay node, a repeater, an access point, a radio access point, a wireless access point, a Ultra-Dense Network/Software-Defined Network (UDN/SDN) radio access node, a Remote Radio Unit (RRU) or a Remote Radio Head (RRH). Furthermore, the first and second network node 110, 111 each comprises multiple antennas for wireless radio communication with wireless devices located within their coverage range; that is, the first and second network node 110, 111 may use one or more of its respective antennas to provide radio coverage within its respective cell 115, 116.

The first and second network nodes 110, 111 may be arranged to communicate directly with each other, e.g. via L2 signaling, and/or via a core network node 101. It should be noted that the core network node 101 is capable of performing some or all actions described in the embodiments of the first and second network node 110 herein. Hence, the core network node 101 may also be said to serve wireless devices in the cells 115, 116. The core network node 101 may e.g. a Mobility Management Entity (MME), a Self-Organizing Network (SON) node, an Operational and Maintenance (O&M) node, an Operational Support Systems (OSS) node, etc. Also, the core network node 101 may be a centralized Radio Resource Controller; in this case, such a central Radio Resource Controller may, in some embodiments, be defined to handle the RRC and PDCP protocol layers, while conventional LTE protocol layers, such as, PHY, MAC and RLC, are handled by the first and second network node 110, 111.

In the example of FIG. 3, a wireless device 121 is located within the cell 115 in the wireless communications network 100. The wireless device 121 may e.g. be any kind of wireless device such as a mobile phone, a cellular phone, a Personal Digital Assistant (PDA), a smart phone, a tablet, a sensor or actuator with wireless communication capabilities, a sensor or actuator connected to or equipped with a wireless device, a Machine Device (MD), a Machine-Type-Communication (MTC) device, a Machine-to-Machine (M2M) communication device, a Customer-Premises Equipment (CPE), a Laptop-Mounted Equipment (LME), a Laptop-Embedded Equipment (LEE), etc.

Furthermore, although embodiments below are described with reference to the scenario of FIG. 3, this scenario should not be construed as limiting to the embodiments herein, but merely as an example made for illustrative purposes.

In the scenario shown in the example of FIG. 3, the wireless device 121 is initially in an active state, e.g. a connected state such as RRC_CONNECTED state, within the cell 115 being served by the first network node 110. This means that the first network node 110 has established a RAN context information for the wireless device 121 in the cell 115 in the wireless communications network 100. This RAN context information is used by the first network node 110 and the wireless device 121 when communicating over the established radio connection 131 in the cell 115 in the wireless communications network 100.

As shown by the first double-dashed arrow 141, the wireless device 121 may then perform a cell reselection, or be handed over to, the cell 116 to be served by the second network node 111. According to other scenarios, the wireless device 121 may optionally remain in the cell 115, but go into an inactive state, i.e. a non-connected or idle state, or experiencing a Radio Link Failure, RLF, e.g. due to moving into poor radio coverage within or outside the cell 115. For any of the above mentioned scenarios, this will conventionally cause both the first network node 110 and the wireless device 121 to discard or delete the RAN context information established in the cell 115.

However, in case some cases, as indicated by the second double-dashed arrow 142, the wireless device 121 may shortly thereafter perform a cell reselection back to, or be handed over back to, the cell 115 to again be served by the first network node 111. In the other scenarios, the wireless device 121 may shortly thereafter go back into an active state, e.g. a connected state such as RRC_CONNECTED state, within the cell 115, or reconnect with the first network node 110 after the RLF. This means that the first network node 110 has to re-establish a RAN context information for the wireless device 121 in the cell 115 in the wireless communications network 100.

This scenario illustrates an example of how semi-stationary wireless devices, such as, the wireless device 121, may toggle back and forth between different states in the cell 115 or toggle between the first and second cells 115, 116 in an active state in the wireless communications network 100. Conventionally, this may cause an excessive amount of signaling in the wireless communication network 100 when continuously having to re-establish a RAN context information for such semi-stationary wireless devices.

In accordance with embodiments described herein, this issue is addressed by storing the RAN context information of a wireless device when the wireless device is no longer in a connected state in the cell, receiving information indicating a RAN context information from the wireless device when the wireless device has returned to a connected state in the cell, and transmitting information indicating that the wireless device is to use the indicated RAN context information in the cell when the indicated RAN context information from the wireless device is such that it can be reused with the RAN context information of the wireless device previously stored.

In other words, as part of developing the embodiments herein, it was noticed that in some network deployments a large number of wireless devices, or rather users of the wireless devices, are semi-stationary under long periods of time and are toggling between an active and an inactive state in its cell. Conventionally, this type of scenario or traffic pattern is handled by the network either by keeping the wireless devices in an active state, e.g. a connected state such as RRC_CONNECTED state, in the cell for a longer period of time than usual or by releasing the wireless devices to inactive state, e.g. an non-connected or idle state, as soon as the wireless device goes inactive in the cell. Here, there may be a trade-off in when to use which state for the wireless devices. The active state, e.g. a connected state such as RRC_CONNECTED state, may, for example, be preferred for wireless devices that are relatively stationary, but toggle frequently between active and inactive periods. This is because the signalling resulting from stationary wireless devices toggling between an active and inactive state in a cell is not so costly, while mobility signaling, such as, handover signaling, for such stationary wireless devices are. On the contrary, the inactive state, e.g. non-connected or idle state, may, for example, be preferred for wireless devices that move around a lot, but have longer active or inactive periods. In this case, the mobility signaling may be less costly than the signalling resulting from stationary wireless devices toggling between an active and inactive state.

In accordance with embodiments described herein, the amount of signaling that is needed for these types of wireless devices, which are switching between active and inactive periods in the same cell or toggling between cells in an active state, is reduced. This also means that excessive signaling for these types of wireless devices in the wireless communication network 100 may be avoided. Hence, signalling in the wireless communications network 100 is improved.

Example of embodiments of a method performed by a network node 110, 101 for handling a Radio Access Network, RAN, context information of a wireless device 121 in a cell 115 served by the network node 110, 101 in a wireless communications network 100, will now be described with reference to the flowchart depicted in FIG. 4. FIG. 4 illustrates an example of actions or operations which may be taken by the network node 110, 101. The method may comprise the following actions.

Action 401

When the wireless device 121 is no longer in a connected state in the cell 115, the network node 110, 101 stores the RAN context information of the wireless device 121. This means that the network node 110, 101 may detect or determine when the wireless device 121 is no longer in a connected state in the cell 115, and in response thereto store or save the RAN context information associated with the wireless device 121. In other words, the network node 110, 101 may cache the last used radio context of the wireless device 121 in the cell 115 when the wireless device 121 goes to into an idle mode or moves to another cell, such as, e.g. cell 116.

The network node 110, 101 may store the RAN context information of the wireless device 121 in an available memory in the network node 110, 101 or in an accessible core network node or site in the wireless communications network 100. Also, when storing the RAN context information of the wireless device 121, the network node 110, 101 may associate the RAN context information of the wireless device 121 with some information or identifier indicating the RAN context information of the wireless device 121. In other words, the information indicating the RAN context information may comprise a RAN context identifier of the wireless device 121 which the network node 110, 101 may later use in order to locate or find the stored RAN context information of the wireless device 121.

In some embodiments, the RAN context information may comprise Radio Resource Control, RRC, protocol information of the wireless device 121. In some embodiments, the RAN context information may comprise one or more identifiers used for the wireless device 121 in the wireless communications network 100. Examples of such identifiers may comprise a Cell Radio Network Temporary Identifier, C-RNTI, a SAE Temporary Mobile Subscriber Identity, S-TMSI, a Globally unique Temporary UE identity, GUTI, etc. In some embodiments, the RAN context information may comprise configuration parameters of the wireless device 121 for a communications protocol on a lower layer than the RRC protocol layer. Examples of such configuration parameters may comprise RLC configuration parameters, e.g. RLC-AM or RLC-UM, or mapping parameters between resource blocks, RBs, and logical channels. In some embodiments, the RAN context information may comprise radio access capability information of the wireless device 121. Examples of such radio access capabilities may comprise some or all of the capabilities defined in the standard 3GPP 36.331, "UE-EUTRA-Capability", such as, e.g. which release the wireless device 121 supports, which wireless device category the wireless device 121 belongs to, which frequency bands and RATs the wireless device 121 support. In some embodiments, the RAN context information may comprise information related to one or more ongoing radio bearers of the wireless device 121. In some embodiments, the RAN context information may comprise one or more security keys and/or sequence numbers associated with the wireless device 121. Examples of such security keys may be a KeNB, a KRRCint, a KRRCenc, aKUPenc, etc. Examples of such sequence numbers may be a PDCP sequence number, a COUNT number, etc.

In some embodiments, the network node 110, 101 may detect or determine that the wireless device 121 is no longer in a connected state in the cell 115 when the network node 110, 101 releases the wireless device 121 from the connected state to an idle state in the cell 115. Alternatively, the network node 110, 101 may detect or determine that the wireless device 121 is no longer in a connected state in the cell 115 when the network node 110, 101 performs a handover of the wireless device 121 to another cell 116 in the wireless communications network 100. According to another alternative, the network node 110, 101 may detect or determine that the wireless device 121 is no longer in a connected state in the cell 115 when the network node 110, 101 releases the wireless device 121 to be served in another cell 116 in the wireless communications network 100. According to yet another alternative, the network node 110, 101 may detect or determine that the wireless device 121 is no longer in a connected state in the cell 115 when the network node 110, 101 detects a radio link failure associated with the wireless device 121. This means that the network node 110, 101 is capable of handling many different scenarios in which the wireless device 121 may toggle back and forth between different states in the cell 115 or toggle between the first and second cells 115, 116 in an active state.

Action 402

Then, when the wireless device 121 has returned to a connected state in the cell 115, the first network node 110 receives information indicating a RAN context information from the wireless device 121. This means that the network node 110, 101 may detect or determine when the wireless device 121 has returned to a connected state in the cell 115, and, in response thereto, receive information indicating a RAN context information from the wireless device 121.

In some embodiments, the network node 110, 101 may detect or determine that the wireless device 121 has returned to a connected state in the cell 115 when the network node 110, 101 detects that the wireless device 121 has moved from an idle state to a connected state in the cell 115.

Alternatively, the network node 110, 101 may detect or determine that the wireless device 121 has returned to a connected state in the cell 115 when the network node 110, 101 receives the wireless device 121 in the cell 115 in a handover from another cell 116 in the wireless communications network 100. According to another alternative, the network node 110, 101 may detect or determine that the wireless device 121 has returned to a connected state in the cell 115 when the network node 110, 101 receives the wireless device 121 in the cell 115 as part of a Radio Resource Configuration, RRC, connection re-establishment of the wireless device 121. Similarly, as in Action 401, this means that the network node 110, 101 is capable of handling many different scenarios in which the wireless device 121 may toggle back and forth between different states in the cell 115 or toggle between the first and second cells 115, 116 in an active state.

In other words, the wireless device 121 may return to the cell 115 by performing a transition from an idle state to a connected state in the cell 115, or by performing an incoming handover to the cell 115 or a cell re-selection to the cell 115. Typically, when returning to the cell 115, the wireless device 121, or a network node 101, 111 in the wireless communications network 100, transmits a message to the network node 110, 101 serving the cell 115. This message may then include the information indicating a RAN context information of the wireless device 121.

Action 403

After receiving the information indication a RAN context information in Action 402, the network node 110, 101 transmits, to the wireless device 121, information indicating that the wireless device 121 is to use the indicated RAN context information in the cell 115 when the indicated RAN context information is such that it can be reused with the RAN context information of the wireless device 121 previously stored by the network node 110, 101.

For example, the network node 110, 101, may attempt to locate stored RAN context information, e.g. perform a look-up or search, based on the indicated RAN context information by the wireless device 121. This may be performed in an available memory in the network node 110, 101, or in an accessible core network node or site in the wireless communications network 100, where the network node 110, 101 store RAN context information in accordance with Action 401. If a RAN context information for the wireless device 121 is found based on the indicated RAN context information by the wireless device 121, then the network node 110, 101 may determine if the stored RAN context information for the wireless device 121 can be re-used for the wireless device 121. In some embodiments, the network node 110, 101 may consider that the stored RAN context information for the wireless device 121 may be re-used for the wireless device 121 upon verifying that the stored RAN context information is the same as or identical to the indicated RAN context information from the wireless device 121. In some embodiments, the network node 110, 101 may consider that the stored RAN context information for the wireless device 121 may be re-used for the wireless device 121 based on a time or event counter. In this case, the stored RAN context information for the wireless device 121 may considered re-usable when the timer has not expired yet or when one or more events associated with the event counter has not happened yet.

In some embodiments, the information indicating the RAN context information may comprise a sequence number associated with the RAN context information of the wireless device 121. In this case, the sequence number may be used by the network node 110, 101 to verify that the RAN context information is up to date in both the wireless device 121 and the network 110, 101 and that RAN context information is synchronized in the wireless device 121 and the network 110, 101.

Alternatively, the information indicating the RAN context information may comprise a checksum based on the RAN context information of the wireless device 121. As for the sequence number, the checksum may also be used by the network node 110, 101 to verify that the RAN context information is up to date in both the wireless device 121 and the network 110, 101 and that RAN context information is synchronized in the wireless device 121 and the network 110, 101. In some embodiments, the checksum may be based on additional information, such as, for example, cell identity of the cell 115, an identity of the wireless device 121, etc. In some embodiments, the checksum may be a cryptographic checksum. The cryptographic checksum may be based on a key used in the wireless device 121 and the network node 110, 101. This may advantageously make it difficult for another wireless device or user to "hijack" or take over the old connection of the wireless device 121.

Furthermore, in some embodiments, the network node 110, 101 may reuse old encryption keys and/or integrity protection keys when storing the RAN context information for the wireless device 121. This means, for example, that the wireless device 121 may use these old encryption keys and/or integrity protection keys as the information indicating the RAN context information. Alternatively, potentially old sequence numbers used for encryption and/or integrity protection may be used. Once the network node 110, 101 has obtained the up to date encryption keys and/or integrity protection keys, the network node 110, 101 may order the wireless device 121 to switch to the new encryption keys and/or integrity protection keys according to the obtained up to date encryption keys and/or integrity protection keys.

Action 404

Optionally, after transmitting the information indicating that the wireless device 121 is to use the indicated RAN context information in the cell 115 in Action 403, the network node 110, 101 may perform a data transmission to the wireless device 121 using the stored RAN context information. This means that the network node 110, 101 does not have to re-establish new RAN context information for the wireless device 121 prior to, for example, transmitting data to the wireless device 121.

However, it should also be noted that, in some embodiments, the network node 110, 101 may even be configured to start transmitting user plane data prior to verifying that the stored RAN context information is still valid. This may, for example, be performed by the network node 110, 101 when it is mandated that the wireless device 121 use a user plane encryption and user plane integrity protection which is terminated in a higher order user plane node in the wireless communications network 100, such as, for example, a PDN Gateway as shown in FIG. 1, than the network node 110, 101 which stores the RAN context information. This is different from the conventional EPS/LTE configuration in wireless communications networks in which the user plane is only encrypted and not integrity protected, and this only between the wireless device 121 and the network node 110. This may advantageously allow the network node 110, 101 to start using the stored RAN context information and start forwarding the user plane data towards the higher order user plane node, even prior to verifying that the stored RAN context information is valid and confirming that it is the right wireless device, i.e. the wireless device 121, that is accessing the wireless communication network via the cell 115. The latter is possible since any attempts by an incorrect wireless device or user will just lead to packets being discarded in the higher order user plane node and because only the right wireless device 121 will be able to correctly perform integrity protection and encryption in a manner that can be verified by the higher order user plane node.

Example of embodiments of a method performed by a wireless device 121 for handling a RAN context information in a cell 115 served by a network node 110, 101 in wireless communications network 100, will now be described with reference to the flowchart depicted in FIG. 5. FIG. 5 illustrates an example of actions or operations which may be taken by the wireless device 121. The method may comprise the following actions.

Action 501

The first wireless device 121 stores the RAN context information of the wireless device 121 when no longer in a connected state in the cell 115. This means that instead of discarding this information, the wireless device 121 may save or cache this information in case of returning to the cell 115.

Action 502

When the wireless device 121 returns to a connected state in the cell 115, the wireless device 121 transmits, to the network node 110, 101, information indicating the stored RAN context information. This means that, upon returning to the cell 115, the wireless device 121 may identify its stored RAN context information to the network node 110, 101 serving the cell 115 in order to enable the network node 110, 101 to determine whether or not the wireless device 121 is able to reuse the same RAN context information that was established for the wireless device 121 the last time it was present in the cell 115.

Action 503

Optionally, the wireless device 121 may receive, from the network node 110, 101, information indicating that the wireless device 121 is to use the stored RAN context information. This means that the network node 110, 101 has verified that the RAN context information stored in the wireless device 121 and indicated to the network node 110, 101 in Action 502 may be reused with the RAN context information for the wireless device 121 available to the network node 110, 101.

Action 503

In response to receiving the information in Action 503, the wireless device 121 may perform a data transmission to the network node 110, 101 using the stored RAN context information. This means that the network node 110, 101 does not have to re-establish new RAN context information for the wireless device 121 when, for example, the wireless device 121 has data to transmit in the cell 115.

Figure 6:
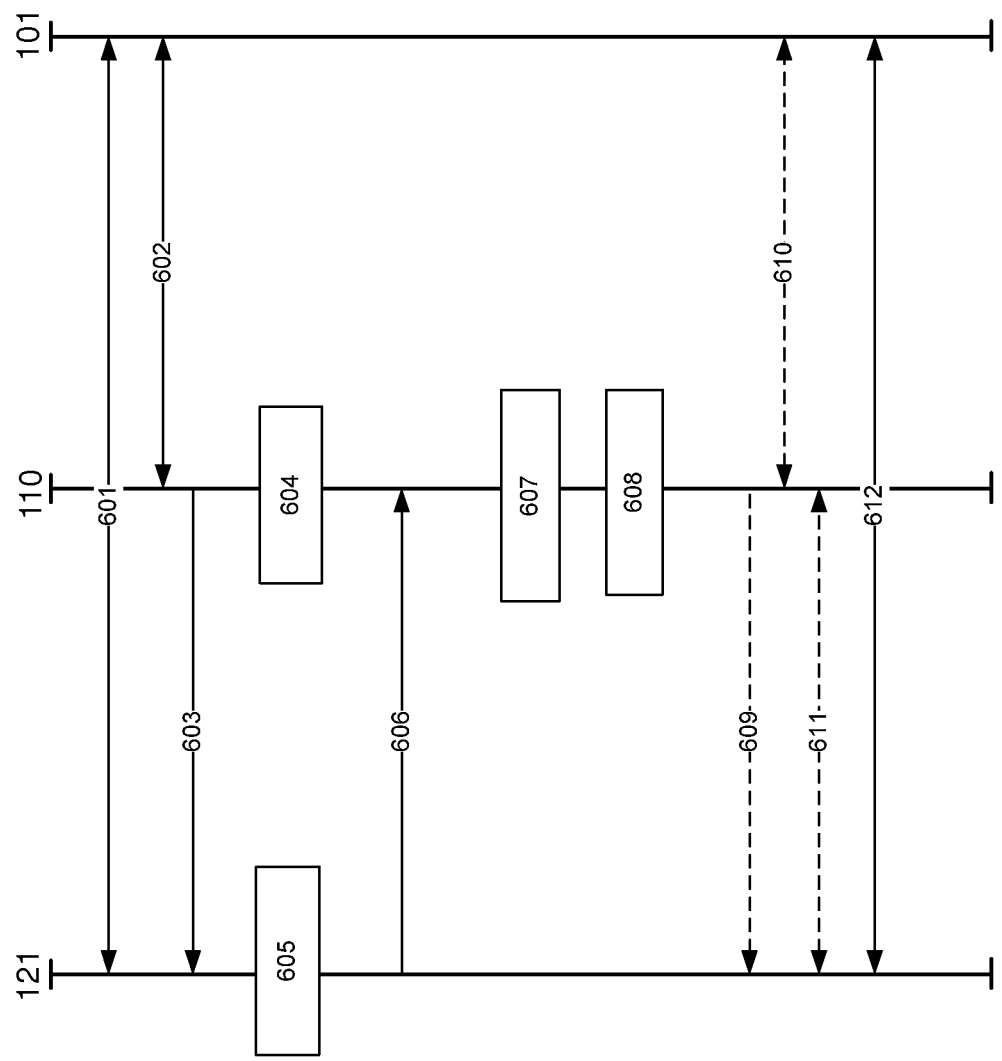
FIG. 6 is a signaling diagram depicting embodiments of a method in a network node and a method in a wireless device.
Figure 7:
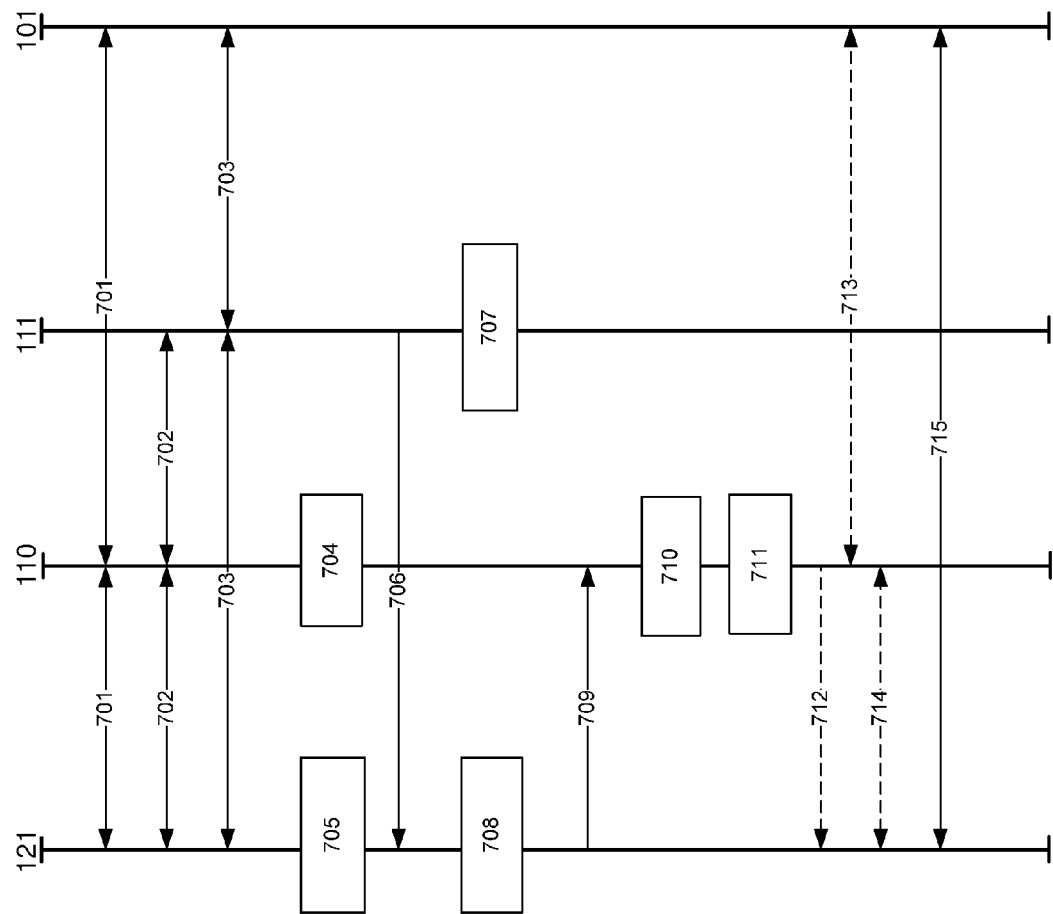
FIG. 7 is another signaling diagram depicting embodiments of a method in a network node and a method in a wireless device.

More detailed examples of the embodiments of the method described above with reference to the flowcharts depicted in FIG. 4-5, will now be described with reference to the signaling diagrams depicted in FIGS. 6 and 7.

Action 601.

The wireless device 121 is connected to network node 110 and is transmitting/receiving data in the cell 115.

Action 602.

A release request/response of the RAN context information of the wireless device 121 is transmitted from/to the network node 110 to/from the core network node 101. The release request/response may comprise information to store S1 related context information of the RAN context information.

Action 603.

The wireless device 121 is released by the network node 110 to an inactive state, e.g. an idle state. Optionally, this may include an instruction to store its current RAN context information.

Action 604.

The network node 110 stores its RAN context information of the wireless device 121 in the cell 115.

Action 605.

The wireless device 121 stores its RAN context information of the cell 115.

Action 606.

The wireless device 121 returns to the cell 115 and transmits a message to enter an active state, e.g. a connected state such as RRC_CONNECTED state, in the network node 110 serving the cell 115. The message comprise information indicating the stored RAN context information in the wireless device 121 for the cell 115, such as, an identifier of the wireless device 121, an optional RAN context information version identity, etc.

Action 607.

The network node 110 retrieves or obtains its stored RAN context information for the wireless device 121 in the cell 115, e.g. from an internal or external storage.

Action 608.

When the stored RAN context information of the wireless device 121 by the network node 110 is up-to-date and may be re-used, the network node 110 proceeds with Action 609 followed by Action 612. However, when the stored RAN context information of the wireless device 121 by the network node 110 is not up-to-date and may not be re-used, the network node 110 proceeds with Actions 610-611 followed by Action 612.

Action 609.

The network node 110 sends instructions to the wireless device 121 to resume data transmissions using its stored RAN context information.

Action 610.

The network node 110 retrieves or obtains new RAN context information for the wireless device 121 from the core network node 101.

Action 611.

The network node 110 and the wireless device 121 perform signalling to setup new RAN context information for the wireless device 121 in the cell 115.

Action 612.

The wireless device 121 is connected to network node 110 and is transmitting/receiving data in the cell 115.

Action 701.

The wireless device 121 is connected to network node 110 and is transmitting/receiving data in the cell 115.

Action 702.

A handover of the wireless device 121 is performed from the cell 115 of the network node 110 to the cell 116 of the network node 111.

Action 703.

The wireless device 121 is connected to network node 111 and is transmitting/receiving data in the cell 116.

Action 704.

The network node 110 stores its RAN context information of the wireless device 121 in the cell 115.

Action 705.

The wireless device 121 stores its RAN context information of the cell 115.

Action 706.

The wireless device 121 is released to an inactive state, e.g. idle state, by the network node 111.

Action 707.

The network node 111 stores its RAN context information of the wireless device 121 in the cell 116.

Action 708.

The wireless device 121 stores its RAN context information of the cell 116.

Action 709.

The wireless device 121 returns to the cell 115 and transmits a message to enter an active state, e.g. a connected state such as RRC_CONNECTED state, in the network node 110 serving the cell 115. The message comprises information indicating the stored RAN context information in the wireless device 121 for the cell 115, such as, an identifier of the wireless device 121, an optional RAN context information version identity, etc.

Action 710.

The network node 110 retrieves or obtains its stored RAN context information for the wireless device 121 in the cell 115, e.g. from an internal or external storage.

Action 711.

When the stored RAN context information of the wireless device 121 by the network node 110 is up-to-date and may be re-used, the network node 110 proceeds with Action 712 followed by Action 715. However, when the stored RAN context information of the wireless device 121 by the network node 110 is not up-to-date and may not be re-used, the network node 110 proceeds with Actions 713-714 followed by Action 715.

Action 712.

The network node 110 sends instructions to the wireless device 121 to resume data transmissions using its stored RAN context information.

Action 713.

The network node 110 retrieves or obtains new RAN context information for the wireless device 121 from the core network node 101.

Action 714.

The network node 110 and the wireless device 121 perform signalling to setup new RAN context information for the wireless device 121 in the cell 115. Action 715. The wireless device 121 is connected to network node 110 and is transmitting/receiving data in the cell 115.

Figure 8:
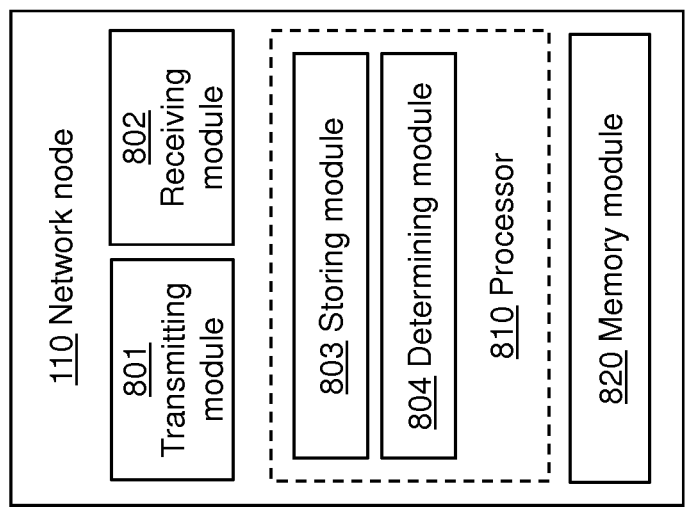
FIG. 8 is a schematic block diagram depicting embodiments of a network node.

To perform the method actions for handling a RAN context information of a wireless device 121 in a cell 115 served by the network node 110, 101 in a wireless communications network 100, the network node 110, 101 may comprise the following arrangement depicted in FIG. 8.

FIG. 8 shows a schematic block diagram of embodiments of the network node 110, 101. In some embodiments, the network node 110, 101 may comprise a transmitting module 801, a receiving module 802, and a processor 810. The transmitting module 801, also referred to herein as transmitter or transmitting unit, may be used to transmit signals to wireless devices 121 in the wireless communications network 100. The receiving module 802, also referred to herein as a receiver or receiving unit, may be used to receive signals from wireless devices 121 in the wireless communications network 100. The transmitting module 801 and the receiving module 802 may also be combined in a transceiving module or transceiver. The processor 810, also be referred to herein as processing module, processing unit or processing circuitry, may control the operation of the network node 110, 101. The processor 810 may also control the transmitter 801 and the receiver 802. Optionally, the processor 810 may comprise one or more of the transmitter 801 and the receiver 802, and/or perform the function thereof.

The network node 110, 101 is configured to store the RAN context information of the wireless device 121 when the wireless device 121 is no longer in a connected state in the cell 115, receive information indicating a RAN context information from the wireless device 121 when the wireless device 121 has returned to a connected state in the cell 115, and transmit, to the wireless device 121, information indicating that the wireless device 121 is to use the indicated RAN context information in the cell 115 when the indicated RAN context information is such that it can be reused with the RAN context information of the wireless device 121 previously stored by the network node 110, 101.

In some embodiments, the network node 110, 101 may be further configured to determine that the wireless device 121 is no longer in a connected state in the cell 115 when the processor 810: releases the wireless device 121 from the connected state to an idle state in the cell 115, or performs a handover of the wireless device 121 to another cell 116 in the wireless communications network 100, or releases the wireless device 121 to be served in another cell 116 in the wireless communications network 100, or detects a radio link failure associated with the wireless device 121.

In some embodiments, the network node 110, 101 may be further configured to determine that the wireless device 121 has returned to a connected state in the cell 115 when the processor 810: detects that the wireless device 121 has moved from an idle state to an connected state in the cell 115, or receives the wireless device 121 in the cell 115 in a handover from another cell 116 in the wireless communications network 100, or receives the wireless device 121 in the cell 115 as part of a Radio Resource Configuration, RRC, connection re-establishment of the wireless device 121.

In some embodiments, the RAN context information comprise RRC protocol information of the wireless device 121, and/or comprises one or more of: one or more identifiers used for the wireless device 121 in the wireless communications network 100; configuration parameters of the wireless device 121 for a communications protocol on a lower layer than the RRC protocol layer; radio access capability information of the wireless device 121; information related to one or more ongoing radio bearers of the wireless device 121; and one or more security keys and/or sequence numbers associated with the wireless device 121.

In some embodiments, the information indicating a RAN context information from the wireless device 121 comprise one or more of: a sequence number associated with the RAN context information of the wireless device 121, or a checksum based on the RAN context information of the wireless device 121.

In some embodiments, the network node 110, 101 may be configured to perform a data transmission to the wireless device 121 using the stored RAN context information.

The embodiments for handling a RAN context information of a wireless device 121 in a cell 115 served by the network node 110, 101 in a wireless communications network 100 may be implemented through one or more processors, such as, e.g. the processor 810 in the network node 110, 101 depicted in FIG. 8, together with computer program code for performing the functions and actions of the embodiments herein. The computer program code mentioned above may also be provided as a computer program product, for instance in the form of a data carrier carrying computer program code or code means for performing the embodiments herein when being loaded into the processor 810 in the network node 110, 101. The computer program code may e.g. be provided as pure program code in the network node 110, 101 or on a server and downloaded to the network node 110, 101. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The network node 110, 101 may further comprise a memory 820, which may be referred to or comprise one or more memory modules or units. The memory 820 may be arranged to be used to store executable instructions and data to perform the methods described herein when being executed in or by the processor 810 of the network node 110, 101. Those skilled in the art will also appreciate that the processor 810 and the memory 820 described above may refer to a combination of analog and digital circuits, and/or one or more processors configured with software and/or firmware, e.g. stored in the memory 820, that when executed by the one or more processors, such as, the processor 810, cause the one or more processors to perform the method as described above. The processor 810 and the memory 820 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 810, cause the at least one processor to carry out the method for handling a RAN context information of a wireless device 121 in a cell 115 served by the network node 110, 101 in a wireless communications network 100. Also, some embodiments may further comprise a carrier containing said computer program product, wherein the carrier is one of an electronic signal, optical signal, radio signal, or computer-readable storage medium.

Figure 9:
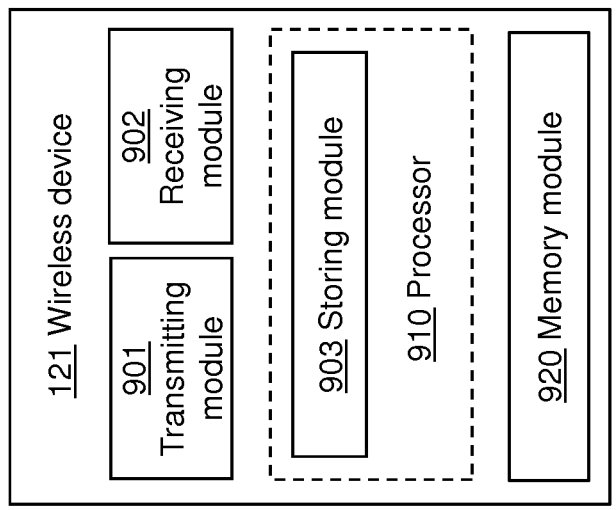
FIG. 9 is a schematic block diagram depicting embodiments of a wireless device.

To perform the method actions for handling a RAN context information in a cell 115 served by a network node 110, 101 in wireless communications network 100, the wireless device 121 may comprise the following arrangement depicted in FIG. 9.

FIG. 9 shows a schematic block diagram of embodiments of the wireless device 121. In some embodiments, the wireless device 121 may comprise a transmitting module 901, a receiving module 902, and a processor 910. The transmitting module 901, also referred to herein as transmitter or transmitting unit, may be used to transmit signals to a network node 110, 101 in the wireless communications network 100. The receiving module 902, also referred to herein as a receiver or receiving unit, may be used to receive signals from network node 110, 101 in the wireless communications network 100. The transmitting module 901 and the receiving module 902 may also be combined in a transceiving module or transceiver. The processor 910, also be referred to herein as processing module, processing unit or processing circuitry, may control the operation of the wireless device 121. The processor 910 may also control the transmitter 901 and the receiver 902. Optionally, the processor 910 may comprise one or more of the transmitter 901 and the receiver 902, and/or perform the function thereof.

The wireless device 121 is configured to store the RAN context information of the wireless device 121 when no longer in a connected state in the cell 115, and transmit, to the network node 110, 101, information indicating the stored RAN context information when the wireless device 121 returns to a connected state in the cell 115.

In some embodiments, the wireless device 121 may be configured to receive, from the network node 110, 101, information indicating that the wireless device 121 is to use the stored RAN context information. In some embodiments, the wireless device 121 may be configured to perform a data transmission to the network node 110, 101 using the stored RAN context information.

The embodiments for handling a RAN context information in a cell 115 served by a network node 110, 101 in wireless communications network 100 may be implemented through one or more processors, such as, e.g. the processor 910 in the wireless device 121 depicted in FIG. 9, together with computer program code for performing the functions and actions of the embodiments herein. The computer program code mentioned above may also be provided as a computer program product, for instance in the form of a data carrier carrying computer program code or code means for performing the embodiments herein when being loaded into the processor 910 in the wireless device 121. The computer program code may e.g. be provided as pure program code the wireless device 121 or on a server and downloaded to the wireless device 121. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The wireless device 121 may further comprise a memory 920, which may be referred to or comprise one or more memory modules or units. The memory 920 may be arranged to be used to store executable instructions and data to perform the methods described herein when being executed in or by the processor 910 of the wireless device 121. Those skilled in the art will also appreciate that the processor 910 and the memory 920 described above may refer to a combination of analog and digital circuits, and/or one or more processors configured with software and/or firmware, e.g. stored in the memory 920, that when executed by the one or more processors, such as, the processor 910, cause the one or more processors to perform the method as described above. The processor 910 and the memory 920 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 910, cause the at least one processor to carry out the method for handling a RAN context information in a cell 115 served by a network node 110, 101 in wireless communications network 100. Also, some embodiments may further comprise a carrier containing said computer program product, wherein the carrier is one of an electronic signal, optical signal, radio signal, or computer-readable storage medium.

Furthermore, various exemplary embodiments are set out in the following statements:

1. A method performed by a network node (110, 101) for handling a Radio Access Network, RAN, context information of a wireless device (121) in a cell (115) served by the network node (110, 101) in a wireless communications network (100), the method comprising storing (401) the RAN context information of the wireless device (121) when the wireless device (121) is no longer in a connected state in the cell (115);

receiving (402) information indicating a RAN context information from the wireless device (121) when the wireless device (121) has returned to a connected state in the cell (115); and transmitting (403), to the wireless device (121), information indicating that the wireless device (121) is to use the indicated RAN context information in the cell (115) when the indicated RAN context information is such that it can be reused with the RAN context information of the wireless device (121) previously stored by the network node (110, 101).

2. The method according to statement 1, further comprising determining that the wireless device (121) is no longer in a connected state in the cell (115) when the network node (110, 101):

releases the wireless device (121) from the connected state to an idle state in the cell (115), or performs a handover of the wireless device (121) to another cell (116) in the wireless communications network (100), or releases the wireless device (121) to be served in another cell (116) in the wireless communications network (100), or detects a radio link failure associated with the wireless device (121).

3. The method according to statement 1 or 2, further comprising determining that the wireless device (121) has returned to a connected state in the cell (115) when the network node (110, 101):

detects that the wireless device (121) has moved from an idle state to an connected state in the cell (115), or receives the wireless device (121) in the cell (115) in a handover from another cell (116) in the wireless communications network (100), or receives the wireless device (121) in the cell (115) as part of a Radio Resource Configuration, RRC, connection re-establishment of the wireless device (121).

4. The method according to any of statement 1-3, wherein the RAN context information comprise RRC protocol information of the wireless device (121), and/or comprises one or more of:

one or more identifiers used for the wireless device (121) in the wireless communications network (100);

configuration parameters of the wireless device (121) for a communications protocol on a lower layer than the RRC protocol layer;

radio access capability information of the wireless device (121);

information related to one or more ongoing radio bearers of the wireless device (121); and one or more security keys and/or sequence numbers associated with the wireless device (121).

5. The method according to any of statement 1-4, wherein the information indicating a RAN context information comprise one or more of: a sequence number associated with the RAN context information of the wireless device (121), or a checksum based on the RAN context information of the wireless device (121).

6. The method according to any of statement 1-5, further comprising performing (404) a data transmission to the wireless device (121) using the stored RAN context information.

7. A network node (110, 101) for handling a Radio Access Network, RAN, context information of a wireless device (121) in a cell (115) served by the network node (110, 101) in a wireless communications network (100), the network node (110, 101) wherein the network node (110, 101) is configured to store the RAN context information of the wireless device (121) when the wireless device (121) is no longer in a connected state in the cell (115), receive information indicating a RAN context information from the wireless device (121) when the wireless device (121) has returned to a connected state in the cell (115), and transmit, to the wireless device (121), information indicating that the wireless device (121) is to use the indicated RAN context information in the cell (115) when the indicated RAN context information is such that it can be reused with the RAN context information of the wireless device (121) previously stored by the network node (110, 101).

8. The network node (110, 101) according to statement 7, further configured to determine that the wireless device (121) is no longer in a connected state in the cell (115) when the network node (110, 101):

releases the wireless device (121) from the connected state to an idle state in the cell (115), or performs a handover of the wireless device (121) to another cell (116) in the wireless communications network (100), or releases the wireless device (121) to be served in another cell (116) in the wireless communications network (100), or detects a radio link failure associated with the wireless device (121).

9. The network node (110, 101) according to statement 7 or 8, further configured to determine that the wireless device (121) has returned to a connected state in the cell (115) when the network node (110, 101):

detects that the wireless device (121) has moved from an idle state to an connected state in the cell (115), or receives the wireless device (121) in the cell (115) in a handover from another cell (116) in the wireless communications network (100), or receives the wireless device (121) in the cell (115) as part of a Radio Resource Configuration, RRC, connection re-establishment of the wireless device (121).

10. The network node (110, 101) according to any of statements 7-9, wherein the RAN context information comprise RRC protocol information of the wireless device (121), and/or comprises one or more of:

one or more identifiers used for the wireless device (121) in the wireless communications network (100);

configuration parameters of the wireless device (121) for a communications protocol on a lower layer than the RRC protocol layer;

radio access capability information of the wireless device (121);

information related to one or more ongoing radio bearers of the wireless device (121); and one or more security keys and/or sequence numbers associated with the wireless device (121).

11. The network node (110, 101) according to any of statements 7-10, wherein the information indicating a RAN context information comprise one or more of: a sequence number associated with the RAN context information of the wireless device (121), or a checksum based on the RAN context information of the wireless device (121).

12. The network node (110, 101) according to any of statements 7-11, further configured to perform a data transmission to the wireless device (121) using the stored RAN context information.

13. The network node (110, 101) according to any of statements 7-12, further comprising a processor (810) and a memory (820), wherein the memory (820) is containing instructions executable by the processor (810).

14. A method performed by a wireless device (110, 101) for handling a Radio Access Network, RAN, context information in a cell (115) served by a network node (110, 101) in wireless communications network (100), the method comprising
   storing (501) the RAN context information of the wireless device (121) when no longer in a connected state in the cell (115); and
   transmitting (502), to the network node (110, 101), information indicating the stored RAN context information when the wireless device (121) returns to a connected state in the cell (115).

15. The method according to statement 14, further comprising
   receiving (503), from the network node (110, 101), information indicating that the wireless device (121) is to use the stored RAN context information.

16. The method according to statement 15, further comprising performing (504) a data transmission to the network node (110, 101) using the stored RAN context information.

17. A wireless device (110, 101) for handling a Radio Access Network, RAN, context information in a cell (115) served by a network node (110, 101) in wireless communications network (100), wherein
   the wireless device (110, 101) is configured to store the RAN context information of the wireless device (121) when no longer in a connected state in the cell (115), and transmit, to the network node (110, 101), information indicating the stored RAN context information when the wireless device (121) returns to a connected state in the cell (115).

18. The wireless device (110, 101) according to statement 17, further configured to receive, from the network node (110, 101), information indicating that the wireless device (121) is to use the stored RAN context information.

19. The wireless device (110, 101) according to statement 18, further configured to perform a data transmission to the network node (110, 101) using the stored RAN context information.

20. The wireless device (110, 101) according to any of statements 17-19, further comprising a processor (910) and a memory (920), wherein the memory (920) is containing instructions executable by the processor (910).

21. A computer program product, comprising instructions which, when executed on at least one processor (810; 910), cause the at least one processor (810; 910) to carry out the method according to any of statements 1-6 or 14-16.

22. A carrier containing the computer program product according to statement 21, wherein the carrier is one of an electronic signal, optical signal, radio signal, or computer-readable storage medium.

In some embodiments, the network node 110, 101 may be a network node for handling a RAN context information of a wireless device 121 in a cell 115 served by the network node 110, 101 in a wireless communications network 100, the network node 110, 101 comprising a storing module 803 for storing the RAN context information of the wireless device 121 when the wireless device 121 is no longer in a connected state in the cell 115, a receiving module 802 for receiving information indicating a RAN context information from the wireless device when the wireless device has returned to a connected state in the cell, and a transmitting module 801 for transmitting, to the wireless device 121, information indicating that the wireless device 121 is to use the indicated RAN context information in the cell 115 when the indicated RAN context information is such that it can be reused with the RAN context information of the wireless device 121 previously stored by the network node 110, 101.

In some embodiments, the network node 110, 101 may be a network node for handling a RAN context information of a wireless device 121 in a cell 115 served by the network node 110, 101 in a wireless communications network 100, the network node 110, 101 comprising a receiver, a processor and a memory, said memory containing instructions executable by said processor whereby said network node 110, 101 is configured to store the RAN context information of the wireless device 121 when the wireless device 121 is no longer in a connected state in the cell 115, receive information indicating a RAN context information from the wireless device when the wireless device has returned to a connected state in the cell, and transmit, to the wireless device 121, information indicating that the wireless device 121 is to use the indicated RAN context information in the cell 115 when the indicated RAN context information is such that it can be reused with the RAN context information of the wireless device 121 previously stored by the network node 110, 101.

In some embodiments, the wireless device may be a wireless device 121 for handling a RAN context information in a cell 115 served by a network node 110, 101 in wireless communications network 100, the wireless device 121 comprising a storing module 903 for storing the RAN context information of the wireless device 121 when no longer in a connected state in the cell 115, and transmitting module 901 for transmitting, to the network node 110, 101, information indicating the stored RAN context information when the wireless device 121 returns to a connected state in the cell 115.

In some embodiments, the wireless device may be a wireless device 121 for handling a RAN context information in a cell 115 served by a network node 110, 101 in wireless communications network 100, the wireless device 121 comprising a receiver, a processor and a memory, said memory containing instructions executable by said processor whereby said wireless device 121 is configured to store the RAN context information of the wireless device 121 when no longer in a connected state in the cell 115, and to transmit, to the network node 110, 101, information indicating the stored RAN context information when the wireless device 121 returns to a connected state in the cell 115.

It should be noted that the modules of the network node 110, 101, as well as the modules of the wireless device 121 may in some embodiments be implemented as computer programs stored in memory (e.g. in the memory modules 820, 920 in FIGS. 8 and 9 respectively) for execution by processors (e.g. the processing modules 810, 910 of FIGS. 8 and 9 respectively).

The terminology used in the detailed description of the particular embodiments illustrated in the accompanying drawings is not intended to be limiting of the described network node 110,101, wireless device 121 and methods therein which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a base station configured to communicate with a user equipment served by the base station in a wireless communications network, the method comprising
    determining that the user equipment is no longer in a connected state in a cell when the base station:
    releases the user equipment from the connected state to an idle state in the cell, or
    performs a handover of the user equipment to another cell in the wireless communications network, or
    releases the user equipment to be served in another cell in the wireless communications network, or
    detects a radio link failure associated with the user equipment;
    storing a Radio Access Network (RAN) context information of the user equipment when the user equipment is no longer in the connected state in the cell;
    receiving information indicating the RAN context information from the user equipment when the user equipment has returned to the connected state in the cell; and
    transmitting, to the user equipment, information indicating that the user equipment is to use the indicated RAN context information in the cell when the indicated RAN context information is such that it can be reused with the RAN context information of the user equipment previously stored by the base station.

2. The method according to claim 1, further comprising determining that the user equipment has returned to the connected state in the cell when the base station:
    detects that the user equipment has moved from an idle state to the connected state in the cell, or
    receives the user equipment in the cell in a handover from another cell in the wireless communications network, or
    receives the user equipment in the cell as part of a Radio Resource Configuration, RRC, connection re-establishment of the user equipment.

3. The method according to claim 1, wherein the RAN context information comprise a Radio Resource Configuration (RRC) protocol information of the user equipment, and/or comprises one or more of:
    one or more identifiers used for the user equipment in the wireless communications network;
    configuration parameters of the user equipment for a communications protocol on a lower layer than a RRC protocol layer;
    radio access capability information of the user equipment;
    information related to one or more ongoing radio bearers of the user equipment; and
    one or more security keys and/or sequence numbers associated with the user equipment.

4. The method according to claim 1, wherein the information indicating the RAN context information comprise one or more of: a sequence number associated with the RAN context information of the user equipment, or a checksum based on the RAN context information of the user equipment.

5. The method according to claim 1, further comprising performing a data transmission to the user equipment using the stored RAN context information.

6. A base station configured to communicate with a user equipment served by the base station in a wireless communications network, wherein
    the base station is configured to determine that the user equipment is no longer in a connected state in a cell when the base station:
    releases the user equipment from the connected state to an idle state in the cell, or
    performs a handover of the user equipment device to another cell in the wireless communications network, or
    releases the user equipment to be served in another cell in the wireless communications network, or
    detects a radio link failure associated with the user equipment;
    the base station is configured to store a Radio Access Network (RAN) context information of the user equipment when the user equipment is no longer in the connected state in the cell, the base station comprising:
    a receiver configured to receive information indicating the RAN context information from the user equipment when the user equipment has returned to the connected state in the cell, and
    a transmitter configured to transmit, to the user equipment, information indicating that the user equipment is to use the indicated RAN context information in the cell when the indicated RAN context information is such that it can be reused with the RAN context information of the user equipment previously stored by the base station.

7. The base station according to claim 6, further configured to determine that the user equipment has returned to the connected state in the cell when the base station:
   detects that the user equipment has moved from an idle state to the connected state in the cell, or
   receives the user equipment in the cell in a handover from another cell in the wireless communications network, or
   receives the user equipment in the cell as part of a Radio Resource Configuration, RRC, connection re-establishment of the user equipment.

8. The base station according to claim 6, wherein the RAN context information comprise a Radio Resource Configuration (RRC) protocol information of the user equipment, and/or comprises one or more of:
   one or more identifiers used for the user equipment in the wireless communications network;
   configuration parameters of the user equipment for a communications protocol on a lower layer than a RRC protocol layer;
   radio access capability information of the user equipment;
   information related to one or more ongoing radio bearers of the user equipment; and
   one or more security keys and/or sequence numbers associated with the user equipment.

9. The base station according to claim 6, wherein the information indicating the RAN context information comprise one or more of: a sequence number associated with the RAN context information of the user equipment, or a checksum based on the RAN context information of the user equipment.

10. The base station according to claim 6, further configured to perform a data transmission to the user equipment using the stored RAN context information.

11. The base station according to claim 6, further comprising a processor and a memory, wherein the memory is containing instructions executable by the processor.

12. A method performed by a user equipment configured to communicate with a base station in a wireless communications network, the method comprising
   determining that the user equipment is no longer in a connected state in a cell when the base station:
   releases the user equipment from the connected state to an idle state in the cell, or
   performs a handover of the user equipment to another cell in the wireless communications network, or
   releases the user equipment to be served in another cell in the wireless communications network, or
   detects a radio link failure associated with the user equipment;
   storing a Radio Access Network (RAN) context information of the user equipment when the user equipment is no longer in the connected state in the cell;
   transmitting, to the base station, information indicating the stored RAN context information when the user equipment returns to a connected state in the cell; and
   receiving, from the base station, information indicating that the user equipment is to use the stored RAN context information.

13. The method according to claim 12, further comprising performing a data transmission to the base station using the stored RAN context information.

14. A user equipment configured to communicate with a base station in a wireless communications network, wherein the user equipment is configured to store a Radio Access Network (RAN) context information of the user equipment when no longer in a connected state in a cell, wherein the user equipment is no longer in the connected state in the cell when the base station:
   releases the user equipment from the connected state to an idle state in the cell, or
   performs a handover of the user equipment to another cell in the wireless communications network, or
   releases the user equipment to be served in another cell in the wireless communications network, or
   detects a radio link failure associated with the user equipment,
   the user equipment comprising:
      a transmitter configured to transmit, to the base station, information indicating the stored RAN context information when the user equipment returns to the connected state in the cell; and
      a receiver configured to receive, from the base station, information indicating that the user equipment is to use the stored RAN context information.

15. The user equipment according to claim 14, further configured to perform a data transmission to the base station using the stored RAN context information.

16. The user equipment according to claim 14, further comprising a processor and a memory, wherein the memory is containing instructions executable by the processor.

17. The method according to claim 1, wherein the information indicating the RAN context information comprises a cryptographic checksum based on the RAN context information of the user equipment and an identity of the user equipment.

18. The method according to claim 1, wherein the information indicating the RAN context information comprises one or more encryption keys and/or integrity protection keys and/or sequence numbers associated with the user equipment.

19. The method according to claim 18, wherein the one or more encryption keys and/or integrity protection keys is a KeNB, a KRRCint, a KRRCenc or a KUPenc, and at least one of the sequence numbers is a PDCP sequence number or a COUNT number.

20. The method according to claim 18, wherein the one or more encryption keys and/or integrity protection keys and/or sequence numbers are reused old encryption keys and/or integrity protection keys and/or sequence numbers, and wherein the method comprises transmitting an order to the user equipment to switch to new encryption keys and/or integrity protection keys according to up to date encryption keys and/or integrity protection keys obtained at the base station.

21. The base station according to claim 6, wherein the information indicating the RAN context information comprises a cryptographic checksum based on the RAN context information of the user equipment and an identity of the user equipment.

22. The base station according to claim 6, wherein the information indicating the RAN context information comprises one or more encryption keys and/or integrity protection keys and/or sequence numbers associated with the user equipment.

23. The base station according to claim 22, wherein the one or more encryption keys and/or integrity protection keys is a KeNB, a KRRCint, a KRRCenc or a KUPenc, and at least one of the sequence numbers may be a PDCP sequence number or a COUNT number.

24. The base station according to claim 22, wherein the one or more encryption keys and/or integrity protection keys and/or sequence numbers are reused old encryption keys and/or integrity protection keys and/or sequence numbers, and wherein the transmitter is further configured to transmit an order to the user equipment to switch to new encryption keys and/or integrity protection keys according to up to date encryption keys and/or integrity protection keys obtained at the base station.

25. The method according to claim 12, wherein the information indicating the stored RAN context information comprises a cryptographic checksum based on the RAN context information of the user equipment and an identity of the user equipment.

26. The method according to claim 12, wherein the information indicating the stored RAN context information comprises one or more encryption keys and/or integrity protection keys and/or sequence numbers associated with the user equipment.

27. The method according to claim 26, wherein the one or more encryption keys and/or integrity protection keys is a KeNB, a KRRCint, a KRRCenc or a KUPenc, and at least one of the sequence numbers is a PDCP sequence number or a COUNT number.

28. The method according to claim 26, wherein the one or more encryption keys and/or integrity protection keys and/or sequence numbers are reused old encryption keys and/or integrity protection keys and/or sequence numbers, wherein the method comprises receiving an order from the base station to switch to new encryption keys and/or integrity protection keys according to up to date encryption keys and/or integrity protection keys obtained at the base station.

29. The user equipment according to claim 14, wherein the information indicating the stored RAN context information comprises a cryptographic checksum based on the RAN context information of the user equipment and an identity of the user equipment.

30. The user equipment according to claim 14, wherein the information indicating the stored RAN context information comprises one or more encryption keys and/or integrity protection keys and/or sequence numbers associated with the user equipment.

31. The user equipment according to claim 30, wherein the one or more encryption keys and/or integrity protection keys is a KeNB, a KRRCint, a KRRCenc or a KUPenc, and at least one of the sequence numbers is a PDCP sequence number or a COUNT number.

32. The user equipment according to claim 30, wherein the one or more encryption keys and/or integrity protection keys and/or sequence numbers are reused old encryption keys and/or integrity protection keys and/or sequence numbers, wherein the receiver is further configured to receive an order from the base station to switch to new encryption keys and/or integrity protection keys according to up to date encryption keys and/or integrity protection keys obtained at the base station.

* * * * *

UNITED STATES PATENT AND TRADEMARK OFFICE
CERTIFICATE OF CORRECTION

PATENT NO. : 9,883,378 B2  
APPLICATION NO. : 14/758634  
DATED : January 30, 2018  
INVENTOR(S) : Mildh et al.

Page 1 of 2

It is certified that error appears in the above-identified patent and that said Letters Patent is hereby corrected as shown below:

On the Title Page

Item (56), under "OTHER PUBLICATIONS", in Column 2, Line 7, delete "Unknon," and insert -- Unknown, --, therefor.

Item (56), under "OTHER PUBLICATIONS", in Column 2, Line 16, delete "Appliation" and insert -- Application --, therefor.

In the Specification

Column 9, Line 11, delete "Configuration," and insert -- Control, --, therefor.

Column 11, Line 46, delete "Action 503" and insert -- Action 504 --, therefor.

Column 11, Line 56, delete "FIG. 4-5," and insert -- FIGS. 4-5, --, therefor.

Column 14, Line 31, delete "Configuration," and insert -- Control, --, therefor.

Column 15, Line 5, delete "Blueray" and insert -- Blu-ray --, therefor.

Column 17, Line 42, delete "Configuration," and insert -- Control, --, therefor.

Column 18, Line 48, delete "Configuration," and insert -- Control, --, therefor.

In the Claims

Column 22, Line 16, Claim 2, delete "Configuration," and insert -- Control, --, therefor.

Column 22, Lines 19-20, Claim 3, delete "Configuration" and insert -- Control --, therefor.

Signed and Sealed this  
Twenty-sixth Day of March, 2019

Andrei Iancu  
*Director of the United States Patent and Trademark Office*

CERTIFICATE OF CORRECTION (continued)
U.S. Pat. No. 9,883,378 B2

Column 23, Line 13, Claim 7, delete "Configuration," and insert -- Control, --, therefor.

Column 23, Lines 16-17, Claim 8, delete "Configuration" and insert -- Control --, therefor.